United States Patent
Dunham et al.

(10) Patent No.: US 10,173,603 B2
(45) Date of Patent: Jan. 8, 2019

(54) VEHICLE SIDE WALL STORAGE

(71) Applicant: FORD GLOBAL TECHNOLOGIES, LLC, Dearborn, MI (US)

(72) Inventors: Scott Holmes Dunham, Redford, MI (US); Ryan Kurrle, Royal Oak, MI (US); Dennis Lowe, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 374 days.

(21) Appl. No.: 14/487,424

(22) Filed: Sep. 16, 2014

(65) Prior Publication Data

US 2016/0075287 A1    Mar. 17, 2016

(51) Int. Cl.
*B60R 9/06* (2006.01)

(52) U.S. Cl.
CPC .................... *B60R 9/065* (2013.01)

(58) Field of Classification Search
CPC  B60R 5/04; B60R 9/065; B60R 11/06; B60R 9/00; B60R 9/02; B60R 9/055; B62D 33/023–33/037; B62D 33/02
USPC ............. 224/402, 403, 404; 296/37.6, 37.1
See application file for complete search history.

(56) References Cited

U.S. PATENT DOCUMENTS

| | | | | |
|---|---|---|---|---|
| 4,750,774 A | * | 6/1988 | Pickering | B60R 11/06 224/401 |
| 4,789,195 A | * | 12/1988 | Fletcher | B60R 11/06 224/404 |
| 4,917,430 A | * | 4/1990 | Lawrence | B60R 7/04 224/281 |
| D310,504 S | * | 9/1990 | Dortch | D12/414.1 |
| 5,150,939 A | | 9/1992 | Simin | |
| 5,819,390 A | * | 10/1998 | Clare | B60R 11/06 224/404 |
| 5,823,598 A | * | 10/1998 | Clare | B60R 11/06 188/322.12 |
| 5,979,973 A | * | 11/1999 | Clare | B60J 10/00 296/187.12 |
| 6,003,923 A | * | 12/1999 | Scott | B60R 11/06 296/37.6 |

(Continued)

FOREIGN PATENT DOCUMENTS

EP       1637396 A1     3/2006

OTHER PUBLICATIONS

BizPac Review, Driver Arrested in Ohio for Having Empty Secret Compartment in Car, www.bizpacreview.com/2013/12/31/driver-arrested-in-ohio-for-having-empty-secret-compartment-in-car, 5 pages, dated Dec. 31, 2013.

*Primary Examiner* — Scott McNurlen
(74) *Attorney, Agent, or Firm* — LeClairRyan

(57) ABSTRACT

In one or more embodiments, a storage system is provided for use with a vehicle including a side wall and a rear wheel positioned below the side wall; the storage system includes a storage container receivable within an elongated space defined between inboard and outboard panels of the side wall, the storage container including front and rearward portions respectively positioned front and rear to the rearmost point of the rear wheel. The storage system may further include a leg portion for supporting the rearward portion of the storage container. The leg portion may be adjustable in length and may be attached to the elongated space or to the storage container.

18 Claims, 5 Drawing Sheets

(56) References Cited

U.S. PATENT DOCUMENTS

| | | | | |
|---|---|---|---|---|
| 6,030,018 A | * | 2/2000 | Clare | B60J 10/00 |
| | | | | 224/404 |
| 6,059,341 A | * | 5/2000 | Jensen | B60P 3/14 |
| | | | | 292/29 |
| 6,485,077 B1 | * | 11/2002 | Foster | B60R 11/06 |
| | | | | 296/183.1 |
| 7,182,177 B1 | * | 2/2007 | Simnacher | B66F 3/12 |
| | | | | 187/211 |
| 7,651,146 B2 | * | 1/2010 | Anderson | B60R 7/02 |
| | | | | 296/37.6 |
| 7,686,365 B2 | * | 3/2010 | Thelen | B60R 9/00 |
| | | | | 220/480 |
| 9,120,510 B1 | * | 9/2015 | Gillam | B60R 9/02 |
| 2001/0013709 A1 | * | 8/2001 | Clare | B60R 11/06 |
| | | | | 296/37.6 |
| 2001/0038219 A1 | * | 11/2001 | Clare | B60R 11/06 |
| | | | | 296/37.6 |
| 2002/0109376 A1 | * | 8/2002 | Gruich | B60R 9/00 |
| | | | | 296/181.5 |
| 2005/0052045 A1 | | 3/2005 | Juzwiak | |
| 2008/0308591 A1 | * | 12/2008 | Henderson | B60R 5/00 |
| | | | | 224/404 |
| 2014/0021232 A1 | * | 1/2014 | Lazarevich | B60P 3/14 |
| | | | | 224/539 |

* cited by examiner

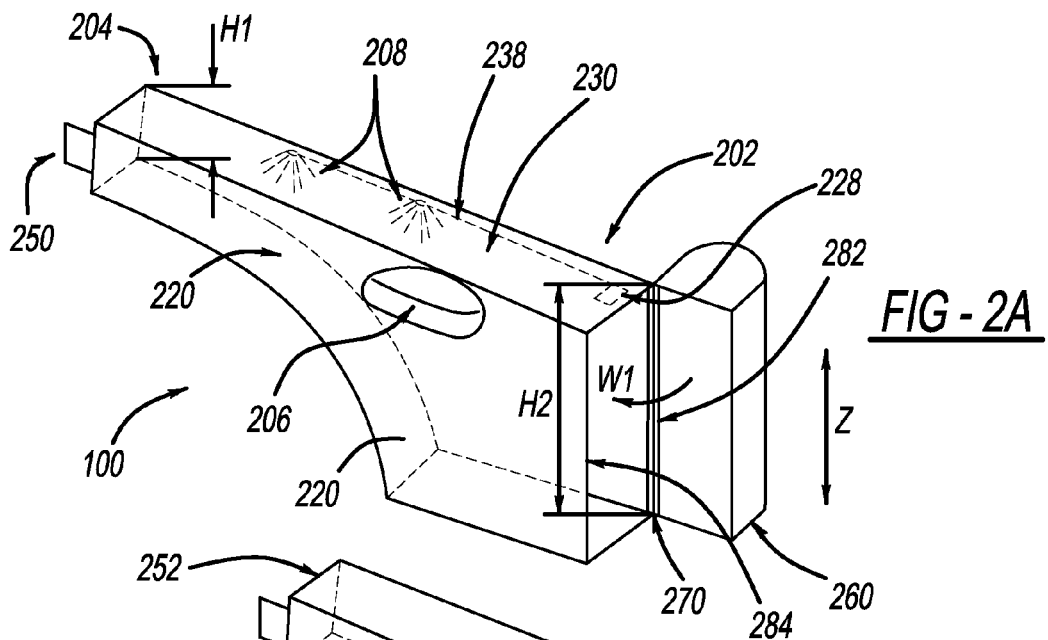
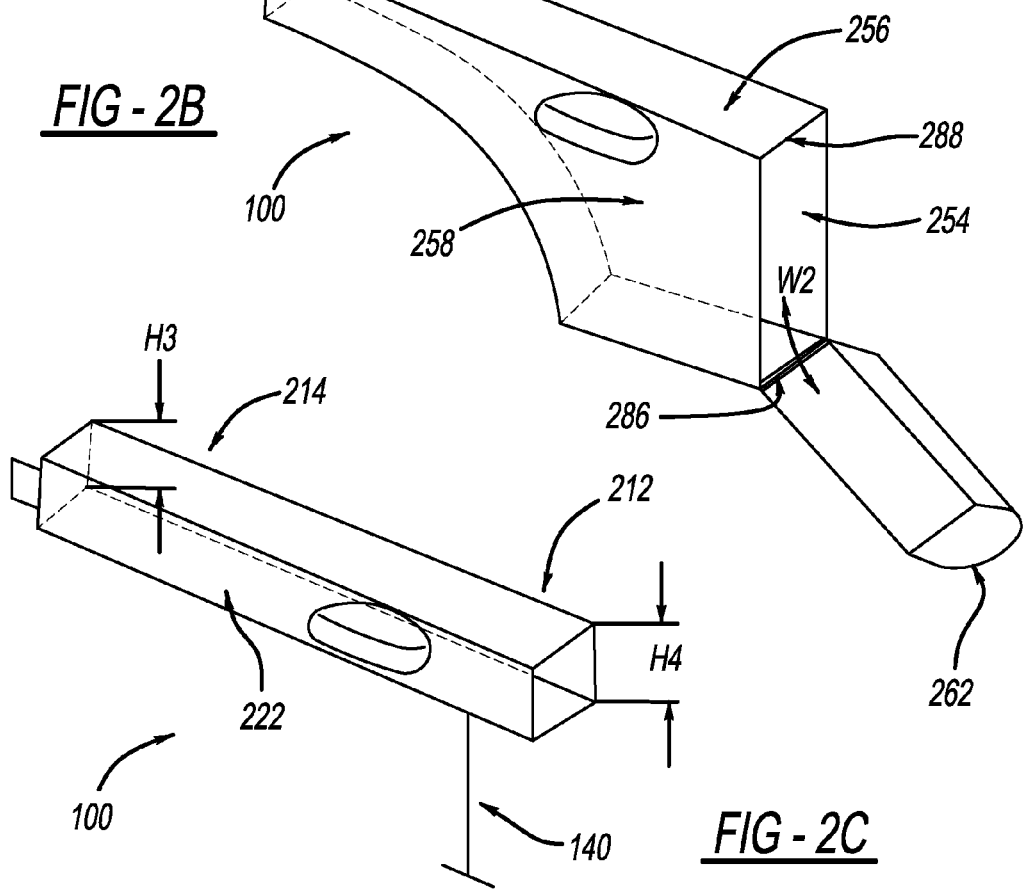

VEHICLE SIDE WALL STORAGE

TECHNICAL FIELD

The disclosed inventive concept relates generally to side wall storage in a vehicle, and particularly in a truck.

BACKGROUND

Regardless of make or manufacture, the search for storage and particularly lockable storage is ongoing. Some of the existing designs for providing storage space have been met with limitations due to particular structures of the vehicles and corresponding layout of many elements contained therein. The lack of suitable storage space is deepened when the to-be-stored items are of unconventional shapes or sizes, such as very elongated objects such as fish poles, hockey sticks, and golf clubs, which may also be delicate and fragile.

SUMMARY

In one or more embodiments, a storage system is provided for use with a vehicle including a side wall and a rear wheel positioned below the side wall; the storage system includes a storage container receivable within an elongated space defined between inboard and outboard panels of the side wall, the storage container including forward and rearward portions respectively positioned forward and rearward to the rearmost point of the rear wheel.

The storage system may further include a leg portion for supporting the rearward portion of the storage container. The leg portion may be adjustable in length and may be attached to the elongated space or to the storage container. In certain instances, the leg portion may also function as a drainage outlet for any unwanted liquid leakage from the storage container.

The storage container may include a closable door such that the storage container is a storage pocket when detached and separate from the vehicle. The storage container may further include a nose portion for attachment to the elongated space. The storage container may further include a handle portion positioned relatively closer to a ceiling of the storage container than to a floor of the storage container. The storage container may be in communication with a tailgate lamp of the vehicle. The storage container may further include a lighting device, positioned within the elongated space, within the storage container, or both. The storage container may include at least one side softer than a floor of the storage container.

The storage system may further include a locking unit to restrict access to the storage container, the locking unit being different from a second locking unit for access to a central storage such as a tailgate trunk storage of the vehicle.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein:

FIG. 2A illustratively depicts a perspective view of a storage container of the vehicle side panel storage system referenced in FIG. 1;

FIG. 2B illustratively depicts an alternative view of the storage container referenced in FIG. 2B;

FIG. 2C illustratively depicts another alternative view of the storage container referenced in FIG. 2A or FIG. 2B;

DETAILED DESCRIPTION OF ONE OR MORE EMBODIMENTS

Figure 1:
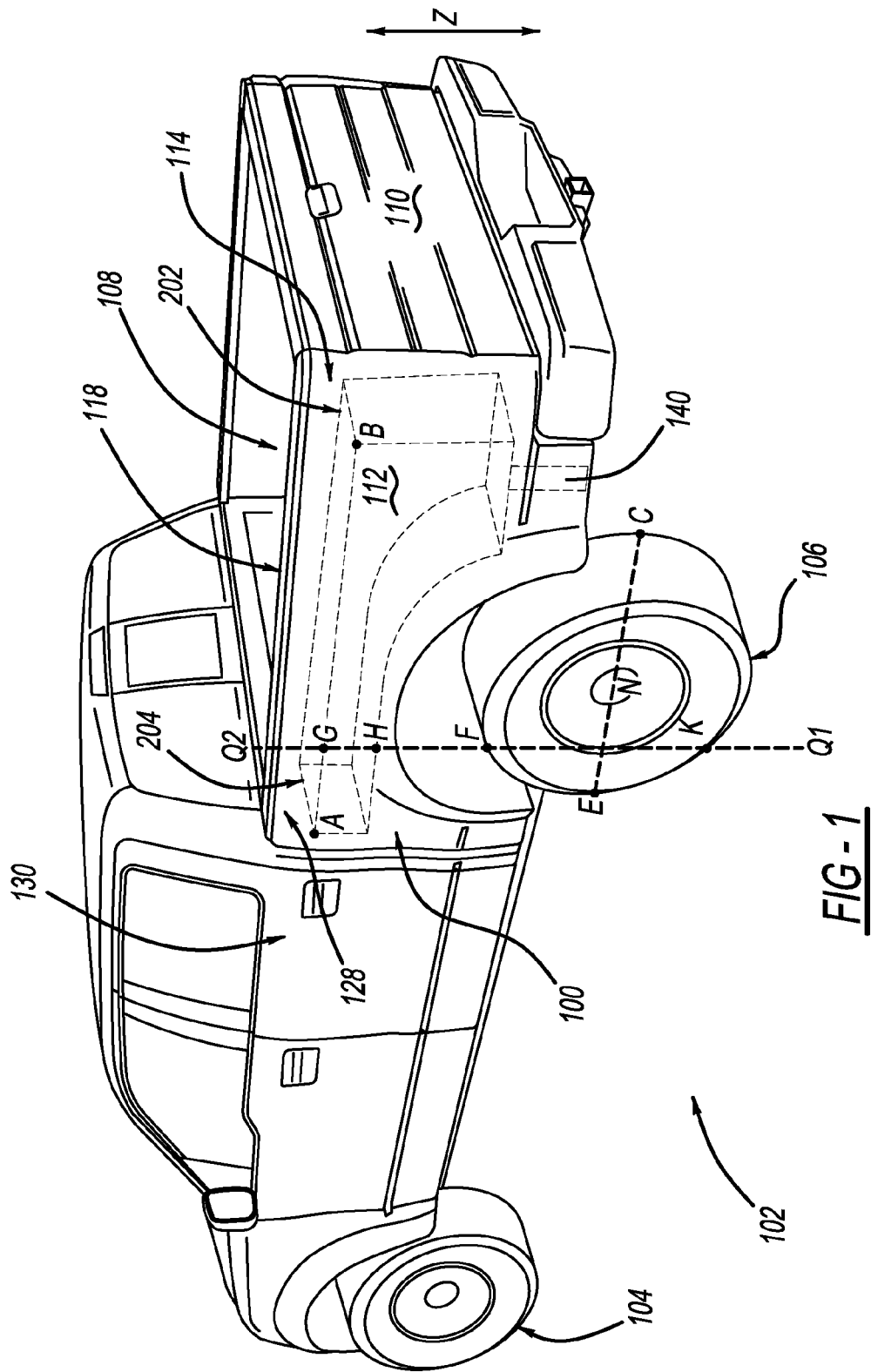
FIG. 1 illustratively depicts a perspective view of a vehicle side wall storage system according to one or more embodiments.

As referenced in the FIG.s, the same reference numerals are used to refer to the same components. In the following description, various operating parameters and components are described for different constructed embodiments. These specific parameters and components are included as examples and are not meant to be limiting.

The present invention in one or more embodiments is advantageous in providing designated, and optionally lockable, storage space for certain elongated articles such as fish poles, hockey sticks and golf clubs. In particular, the designated storage space is located between inboard and outboard panels of a side wall of a pickup truck and takes advantageous use of the space above and over the rear wheel. In addition, one or more storage containers may be provided to hold the elongated articles and the subsequently loaded storage containers may be completely detached from the designate storage space as a convenient carryon item. In addition also, and as detailed herein elsewhere, the one or more storage containers may be provided with a locking unit that is absent from plain sight and hence a dual lock feature in view of the locking mechanism already present through the tailgate. Moreover, and alternatively, the elongated storage container may be conveniently filled with sand or other suitable weighty materials for use as traction assistance during adverse driving conditions.

As illustratively depicted in FIG. 1, a storage system generally shown at 100 is provided for use with a vehicle 102 including front and rear wheels 104, 106, a side wall 108 and a tail end 110. The vehicle 102 may be of any suitable types such as passenger vehicles and pickup trucks with a cargo area. When the vehicle 102 is a truck as shown in FIG. 1, at least a portion of the side wall 108 is positioned between the rear passenger door 130 and the tail end 110, and above the rear wheel 106. The storage system 100 includes a storage container 112 receivable within an elongated space 114 defined between inboard and outboard panels 118, 128 of the side wall 108.

Referring back to FIG. 1 and in view of FIG. 2A, the storage container 112 includes a forward portion 204 and a rearward portion 202, which together define a longitudinal dimension "AB" of the storage container 112. The forward portion 204 may include a portion of the storage container 112 that includes point "A", which is optionally the foremost point of the storage container 112. The rearward portion 203 may include a portion of the storage container 112 that includes point "B", which is optionally the rearmost point of the storage container 112. The length "AB" may be of any suitable values and dependent upon the vehicle types at hand. Moreover, the length "AB" may also vary from side to side within the same vehicle depending upon certain other parameters such as fuel fill routing. In certain embodiments, the length "AB" is no less than 35 inches, 40 inches, or 50 inches, and no greater than 100 inches, 95 inches or 90 inches. In certain particular embodiments, the length "AB" is between 40 to 90 inches, 44 to 86 inches, or 48 inches to 82 inches.

Referring back to FIG. 1, a non-limiting example of how the storage container 112 is positioned relative to the rear wheel 106 may be explained by a cross-section "Q1-Q2" taken along a vertical "Z" direction of the vehicle 102. The cross-section "Q1-Q2" as depicted includes a section "GH" of the storage container 112 and a section "FK" of the rear wheel 106, wherein the section "GH" is positioned between point "E" and point "C," or in particular between point "E" and point "N" or point "N" and point "C". Points "E", "N" and "C" refer to the foremost, the center, and the rearmost point of the rear wheel 106, respectively. In certain embodiments, the foremost point "A" of the storage container 100 may be positioned forward of the foremost point "E" of the rear wheel 106. Without wanting to be limited to any particular theory, it is believed that the storage container 112 thus positioned provides a beneficial employment of storage usage suitable for certain items with unconventional dimensions and particular need for care in handling, wherein certain area within the elongated space 114 such as the forward portion 204 that is upward and forward to the center "N" of the rear wheel 106 may be effectively utilized for various storage purposes.

The storage system 100 as described herein may be similarly positioned on the other side of the vehicle 102, which is opposite to the side wall 108. However for the mere benefit of brevity, similar details on the other side are not reproduced herein.

In certain embodiments, and in view of FIG. 2A, the forward portion 204 is of a height "H1" and the rearward portion 202 is of a height "H2" defined along direction "Z," wherein height H2 is greater in value than height H1. Transitioning in height from the forward portion 204 toward the rearward portion 202 accommodates at least in part the presence of the rear wheel 106 positioned below the storage container 212. In addition, the storage container 112 may include a floor 220 connecting the forward portion 204 and the rearward portion 202, wherein at least a portion of the floor 220 may be configured to follow in part an exterior contour of the rear wheel 106. This configuration is particularly advantageous to accommodate items that have a differential dimension in length, and particularly those with a thinner head and bulky tail such as hockey sticks and tennis rackets.

Suitable variations in shape and construction may be provided to the storage container 112 of FIG. 2A. For instance, and in view of FIG. 2C, the storage container 112 in a variation includes a rearward portion 212 and a forward portion 214 with a height "H3" substantially equal in value to a height "H4" provided to the rearward portion 212. This configuration may be helpful in providing a floor 222 that is substantially leveled between the rear passenger door 130 and the rear wheel 106, such that certain delicate items such as fish poles may rest upon the floor 222 without having to unnecessarily sustain impact due to any movement of the vehicle 102 itself and/or an unleveled floor such as the floor 222.

In one or more embodiments, the term "substantially" refers to a difference between two values in an amount of no greater than 25 percent, 20 percent, 15 percent, 10 percent, or 5 percent.

Referring back to FIG. 1, the storage system 100 may further include a leg portion 140 to support the storage container 112 and position the latter for better balance within the elongated space 114. The leg portion 140 may be a fixture to the elongated space 114, may be a fixture to the storage container 112, and may be a fixture in part to the elongated space 114 and in part to the storage container 112. Optionally, the leg portion 140 may be completely detachable from either the elongated space 114 or the storage container 112. Optionally also, the leg portion 140 may be configured as a drainage outlet for leading out from the storage container 112 any unwanted liquids. The leg portion 140 may be of any suitable shape and formed of any suitable material. In certain designs, the leg portion 140 may be adjustable in height along the "Z" direction, and may be telescopic in particular. The leg portion 140 may further be foldable to provide variable length.

Referring back to FIG. 2A, the storage system 100 may further include a nose portion or protrusion 250 for attachment to a corresponding location within the elongated space 114 to distribute weight and stabilize the storage container 112 as positioned within the elongated space 114. In certain embodiments, the nose portion 250 may be attached to the forward portion 204 of the storage container 114.

In certain embodiments, and as illustratively depicted in FIG. 2A, the storage system 100 may further include a closable door 260 attachable to the storage container 112 such that the storage container 112 becomes a covered storage pocket when detached and separate from the vehicle 102. Because it is closed, contents within the storage container 112 are largely prevented from accidentally falling out. One may carry the entire storage pocket along with the contents contained therein as a carry-on item.

Referring back to FIG. 2A, the cover 260 is detachably or permanently connected to an edge 282 of the storage container 112 via a connector 270. Alternatively, although not shown, the cover 260 may be connected to an edge 284 opposing the edge 282 via similar connecting structures. The connector 270 may be a hinge or a living hinge in particular, which facilitates a partial or complete separation of the cover 260 from the storage container 112 in a direction "W1". Various hinges, as illustratively depicted in FIG. 5A through FIG. 5E are non-limiting examples for connector 270 and/or connector 272 mentioned herein elsewhere in relation to FIG. 2B. The cover 260 may be detached from the storage container 112 via any suitable disengagement of the connector 270, which may include disengagement via sliding the cover off of the storage container 112 along direction "Z".

In certain embodiments, and in view of FIG. 2B which illustratively depicts a cover 262, as an alternative view of the cover 260 shown in FIG. 2A. The cover 262 may be positioned about a lower edge 286 such that the cover 262 is detachably connected to the storage container 112 via the connector 272 which may be a hinge or a living hinge in particular. Alternatively the cover 262 may be connected to an upper edge 288 opposing the lower edge 286 via similar connecting structures. The connector 272 facilitates a partial or complete disengagement of the cover 262 from the storage container 112 in a direction "W2". Any suitable methods of disengagement may be used, including the methods described herein in relation to the cover 260.

For the mere benefit of illustration and brevity, the cover 260 and cover 262 have been described herein in relation to the storage container 112 shown to have a rectangular cross-section. However, the storage container 112 may be provided with any suitable cross-sectional shapes. Accordingly a cover for the storage container 112 may be configured to fit such variation in the cross-sectional shape of the storage container 112.

In certain embodiments, the storage system 100 may further include a handle 206 for the ease of insertion into and retrieval from the elongated space 114. The handle 206 may be provided directly to the storage container 112 and may optionally be in the form of a built-in recess built such as that shown in FIG. 2A, FIG. 2B or FIG. 2C. The handle 206 may be of any suitable shape, design and may be located at any suitable position. By way of example, the handle 206 may be positioned relatively closer to a ceiling wall 230 of the storage container 112 than to the floor 220 of the storage container 112.

In certain embodiments, and in view of FIG. 2A, the storage container 112 may be provided with one or more illumination devices 208, with non-limiting examples thereof including light emitting diode (LED) lights optionally spaced apart from each other for assisting one's locating and retrieving items. Optionally, the one or more illumination devices 208 may be connected between each other and/or connected with a box controller 228 via one or more wires 238. The box controller 228 may be battery driven or be electrically connected to the rest of the vehicle via wires through, for instance, the connector 270 or the connector 272. In the event of being battery driven, the control box may be provided with snap-in access door (not shown) for installing or replacing batteries.

Referring back to FIG. 2A and FIG. 2B, the cover 260 or 262 may be integral to a tailgate lamp, or may itself be the tailgate lamp or a portion thereof. The tailgate lamp may receive electrical connection via wiring at or through the connector 270, 272, the storage container 112 or other parts of the elongated space 114. In this connection, and when illuminating device 208 is employed, the illuminating device 208 and the tailgate lamp at the cover 260 or 262 may retrieve electrical energy from a same energy source.

Figure 3:
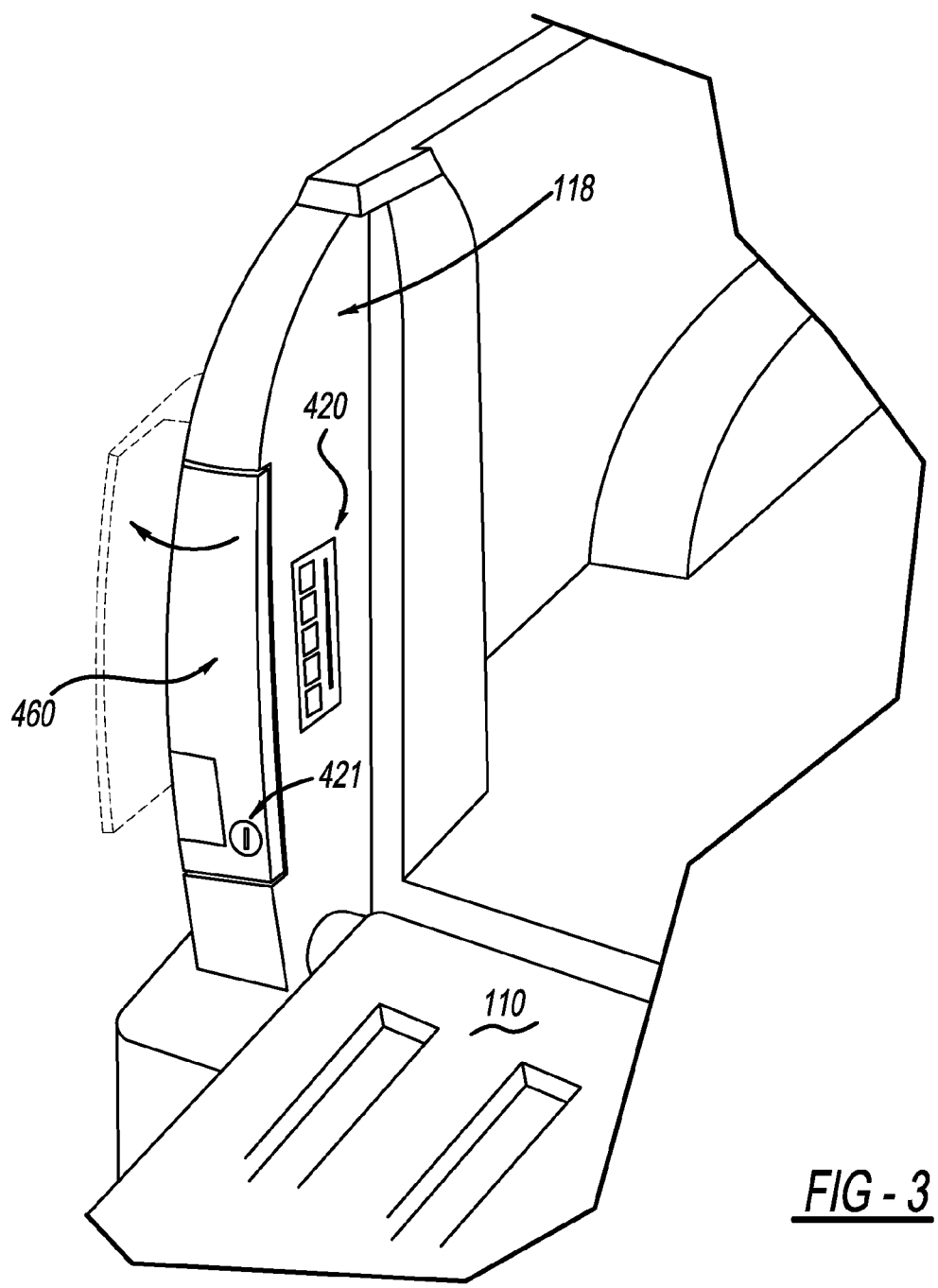
FIG. 3 illustratively depicts a perspective view of a lock unit for locking and operating the storage container referenced in FIG. 2A, FIG. 2B or FIG. 2C.

In certain embodiments, and in view of FIG. 3, the storage system 100 may further include a locking unit 420 to restrict access to the storage container 112. In this configuration, the locking unit 420 may be accessible for locking or unlocking on the inboard 118 of the side wall 108. To reach for access, the tail end 110 first be disengaged from an upright position relative to the truck bed to a position as shown in FIG. 3, only at which the locking unit 420 may become visible for operational access. This is beneficial in providing a so-called "dual lock" mechanism wherein the storage container 112 or access thereto is not in plain sight without having to first unlock the tail end 110. In other words, when the tail end 110 is in upright vertical position, such as the positioned depicted in FIG. 1, access to the locking unit 420 is neither visible nor available. Of course, a key entry 421 may also be provided to an exterior surface of the tailgate lamp 460 where the dual lock function stated herein elsewhere in relation to the locking unit 420 is not in certain instances suitable, and where a readily available access to the storage container 112 is simply what is at hand needed.

In one design, upon unlocking via the locking unit 420, the tailgate lamp 460 may be unlocked and become open. With the opening of the tailgate lamp 460, access to the storage container 112 becomes available. As mentioned herein elsewhere, the tailgate lamp 460 may be an integral cover of the storage container 112, or the storage container 112 has its own cover separate and different from the tailgate lamp 460. In either scenario, the locking unit 420 may be operable to restrict and control access to the storage container 112.

The locking unit 420 may be operable via any suitable lock and key structures, or any suitable keyless entry systems otherwise available.

In certain embodiments, the locking unit 420 is separable and different from a locking unit or locking system directed to operational controls for access to the truck bed via the tail end 110. In other words, one may need to operate on the first locking unit to gain access to the truck bed, and then operate on the second locking unit which is the locking unit 420 to gain access to the storage container 112. In this connection, access to the storage container 112 is double locked.

Figure 4:
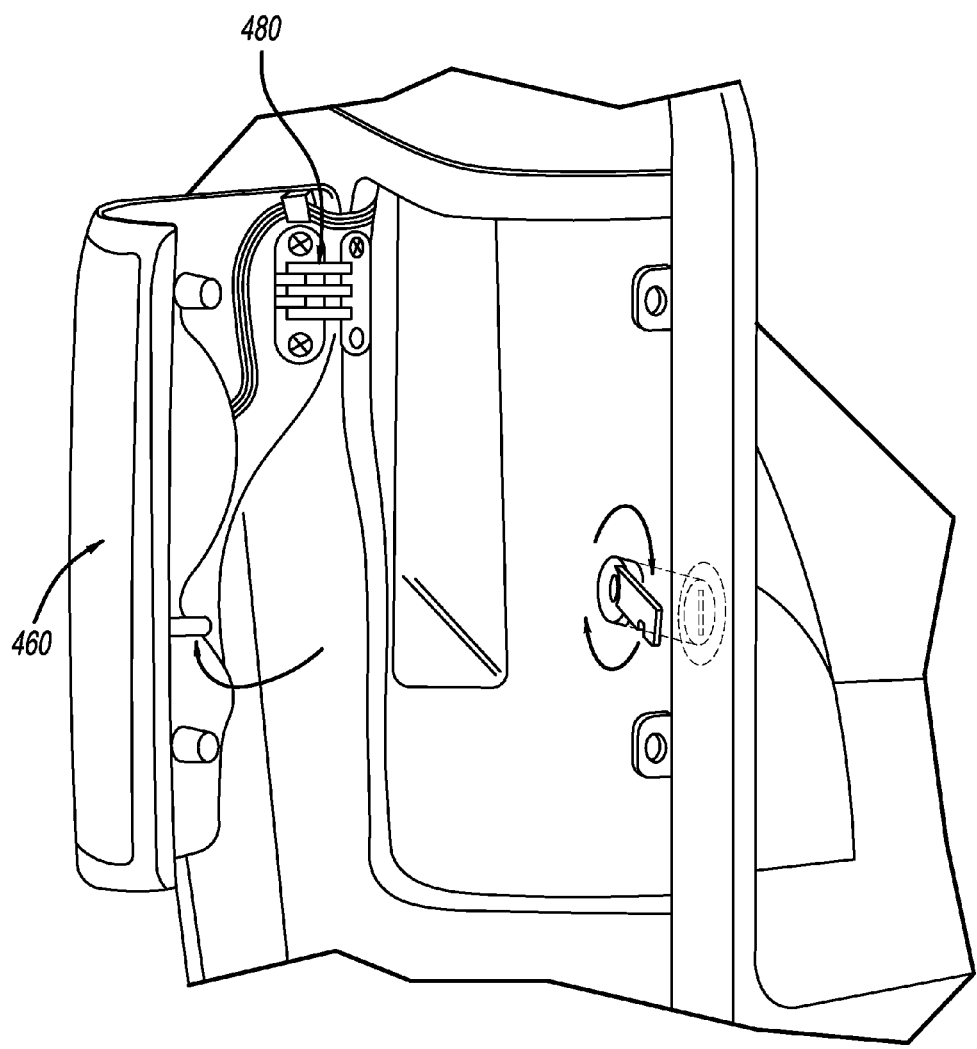
FIG. 4 illustratively depicts a partial perspective view of a dual lock feature of the vehicle side wall storage system referenced in FIG. 1.
Figure 5A:
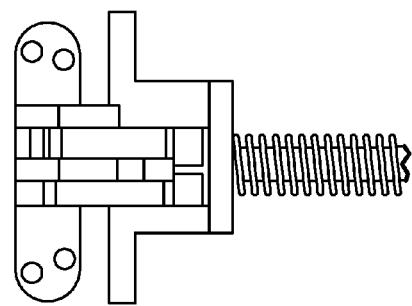
FIG. 5A through FIG. 5E illustratively depict various perspective views of hinge connectors and flat wires that may be used in the vehicle side wall storage system referenced in FIG. 4.
Figure 5B:
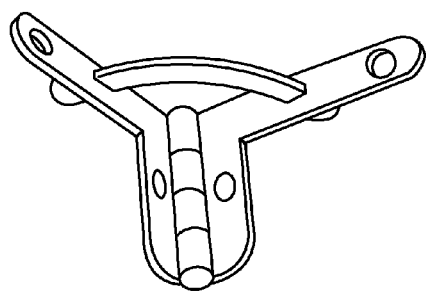
Figure 5C:
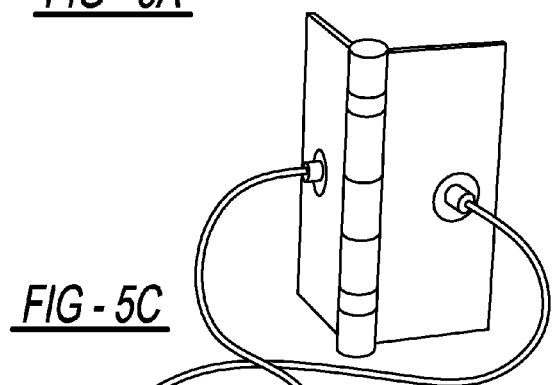
Figure 5D:
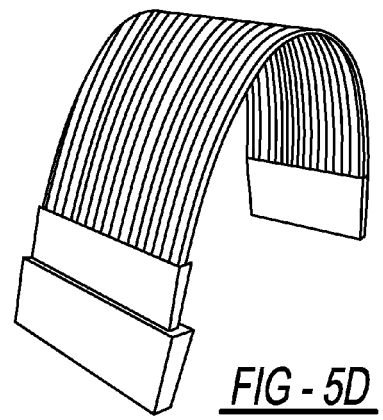
Figure 5E:
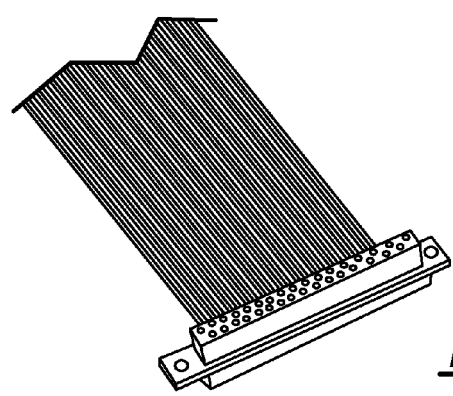

Referring back to FIG. 2A and further in view of FIG. 4, various forms of wire connections may be employed to provide electrical connections between the illumination device 208 and the tailgate lamp 460. As illustratively depicted in FIG. 4, laminated flat wires may be used to carry out the electrical connection. FIG. 5D and FIG. 5E illustratively depict views of non-limiting examples of the flat wires that may be used.

Referring back to FIG. 2A and FIG. 2B, and in view of FIG. 4, various forms of hinge connectors may be employed to provide structural integrity and flexibility between the tailgate lamp 460 and the elongated space 114 such that the tailgate lamp 460 may pivot about the hinge connector 480 and provide open access to the storage container 112. FIG. 5A, FIG. 5B and FIG. 5C illustratively depict views of non-limiting examples of the hinge connectors that may be used. Referring back to FIG. 2A, FIG. 2B or FIG. 2C, the storage container 112 may be configured to include a side wall 252, 254, 256 and 258, or a ceiling wall 230 that is softer in material than the floor 220 or 222. One benefit of this configuration is that the storage container 212 is thus provided with relatively enhanced flexibility in accommodating items to be stored therein. This is particularly useful where additional cushion materials may be provided within the storage container 112 to protect the items to be stored, and that the enhanced flexibility facilitates the use of additional cushion materials. The relatively softer side walls and/or ceiling wall may include or constructed from rubber, soft plastics, or structured leather or cardboard materials. The relatively more rigid floor may include or constructed from rigid plastics and/or metals.

Another beneficial use of the storage container 112 is to use the storage container 112 as a safety weight during certain adverse driving conditions. In particular, the storage container 112 may be filled with, in part or full, weight materials such as sand, stone, wood chips or any other suitable materials and function as a weight for providing traction over the rear wheel 106. Due to the presence of the forward portion 204 which is forward of the rear wheel 106, the weight is relatively distributed well over the entire rear wheel 106, which helps provide the enhanced traction that is advantageous for certain driving conditions, such as driving over slippery roads.

In one or more embodiments, the present invention as set forth herein is believed to have overcome certain challenges faced by vehicle applications wanting designated spaces for certain particular elongated items or spaces with restricted access. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A storage system comprising:
a pickup truck bed;
a pickup truck fender having a length, said pickup truck fender including a fixed inboard panel, a fixed outboard panel, and a wheel well for a rear wheel;
an elongated space defined between said fixed inboard and outboard panels and said wheel well, said elongated space including an arched area defined by said wheel well; and
a storage container removably receivable within said elongated space and slidable along said length of said pickup truck fender, said storage container including an underside comprising an arched portion and a straight portion, said arched portion enabling said storage container to nest within said elongated space when fitted therein, said storage container including forward and rearward portions respectively positionable forward and rearward of said wheel well, said storage container further including a plurality of sides, at least one of said sides being softer than said underside of said storage container.

2. The storage system of claim 1, further comprising a leg portion for supporting said rearward portion of said storage container.

3. The storage system of claim 2, wherein said leg portion is adjustable in length.

4. The storage system of claim 1, wherein said storage container includes a closable door such that said storage container is a storage pocket when detached and separate from within said elongated space.

5. The storage system of claim 1, wherein said storage container includes a nose portion for attachment within said elongated space.

6. The storage system of claim 1, wherein said storage container includes a handle portion positioned relatively closer to a ceiling of said storage container than to a floor of said storage container.

7. The storage system of claim 1, wherein said pickup truck fender includes a tailgate lamp, said tailgate lamp being reversibly movable between a closed position and an open position, said tailgate lamp restricting access to said storage container within said elongated space when in said closed position and permitting access to said storage container within said elongated space when in said open position.

8. The storage system of claim 1, further comprising an illumination device, said illumination device fixed within said storage container for illuminating an interior thereof.

9. The storage system of claim 1, further comprising a locking unit positioned on said inboard panel hidden from plain sight when a tail end of said pickup truck bed is in an upright position.

10. A storage system comprising:
a pickup truck bed;
a pickup truck fender having a length, said pickup truck bed including a fixed inboard panel, a fixed outboard panel, and a wheel well for a rear wheel;
an elongated space defined between said fixed inboard and outboard panels and said wheel well, said elongated space including an arched area defined by said wheel well;
a storage container removably receivable within said elongated space and slidable along said length of said pickup truck fender, said storage container including an underside comprising an arched portion and a straight portion, said arched portion enabling said storage container to nest within said elongated space when fitted therein, said storage container including forward and rearward portions respectively positionable forward and rearward of said wheel well, said storage container having an interior space;
a leg portion extending between said pickup truck fender and said storage container for supporting a rearward portion of said storage container when received within said elongated space, said leg portion being adjustable in height; and
an illumination device fixed within said storage container for illuminating said interior space of said storage container.

11. The storage system of claim 10, wherein said leg portion is fixed to said storage container.

12. The storage system of claim 10, wherein said leg portion is fixed to said pickup truck fender.

13. The storage system of claim 10, wherein said storage container includes a closable door such that said storage container is a storage pocket when detached and separate from within said elongated space.

14. The storage system of claim 10, wherein said storage container includes a nose portion for attachment within said elongated space.

15. The storage system of claim 10, wherein said storage container includes a handle portion positioned relatively closer to a ceiling of said storage container than to a floor of said storage container.

16. The storage system of claim 10, wherein said pickup truck fender includes a tailgate lamp, said tailgate lamp being reversibly movable between a closed position and an open position, said tailgate lamp restricting access to said storage container within said elongated space when in said closed position and permitting access to said storage container within said elongated space when in said open position.

17. The storage system of claim 10, further comprising a locking unit positioned on said inboard panel hidden from plain sight when a tail end of said pickup truck bed is in an upright position.

18. A storage system comprising:
a pickup truck bed;
a pickup truck fender having a length, said pickup truck fender including a fixed inboard panel that defines a wall of said bed, a fixed outboard panel, and a wheel well for a rear wheel;
an elongated space defined between said fixed inboard and outboard panels, said elongated space including an arched area defined by said wheel well;
a storage container removably receivable within said elongated space, said storage container including forward and rearward portions respectively positionable forward and rearward to the rearmost point of said wheel well, said storage container further including a closable door such that said storage container is a storage pocket when detached and separate from within said elongated space, said storage container further including an underside comprising an arched portion and a straight portion, said arched portion enabling said storage container to nest within said elongated space when fitted therein; and a locking unit for controlled access to said storage container, said locking unit positioned on said inboard panel hidden from plain sight when a tail end of said pickup truck bed is in an upright position.

* * * * *